US008351718B2

(12) United States Patent
Maeda (10) Patent No.: US 8,351,718 B2
(45) Date of Patent: Jan. 8, 2013

(54) IMAGE DATA PROCESSING APPARATUS, IMAGE FORMING APPARATUS PROVIDED WITH THE SAME, IMAGE DATA PROCESSING PROGRAM, AND IMAGE DATA PROCESSING METHOD

(75) Inventor: Hiroshi Maeda, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 958 days.

(21) Appl. No.: 11/976,057

(22) Filed: Oct. 19, 2007

(65) Prior Publication Data

US 2008/0101706 A1    May 1, 2008

(30) Foreign Application Priority Data

Oct. 30, 2006    (JP) .................................. 2006-294476

(51) Int. Cl.
*G06K 9/36* (2006.01)
(52) U.S. Cl. .................................. 382/234; 358/426.03
(58) Field of Classification Search .......... 382/232–253; 358/1.13–1.18, 226, 444, 445, 448, 452, 358/453, 462
See application file for complete search history.

(56) References Cited

U.S. PATENT DOCUMENTS

| | | | | |
|---|---|---|---|---|
| 5,969,828 A * | 10/1999 | Kawasaki et al. | .............. | 382/235 |
| 6,246,795 B1 * | 6/2001 | Kanbegawa | .................. | 382/232 |
| 6,381,031 B1 * | 4/2002 | Mishima | ...................... | 358/1.15 |
| 6,389,170 B1 * | 5/2002 | Kawasaki et al. | .............. | 382/232 |
| 6,665,082 B1 * | 12/2003 | Takeoka et al. | .............. | 358/1.15 |
| 6,690,832 B1 * | 2/2004 | Mitchell et al. | ............... | 382/233 |
| 6,941,019 B1 * | 9/2005 | Mitchell et al. | ............... | 382/232 |
| 7,146,053 B1 * | 12/2006 | Rijavec et al. | ................ | 382/233 |
| 7,580,151 B2 * | 8/2009 | Kurose et al. | .................. | 358/1.9 |
| 7,580,581 B2 * | 8/2009 | Namera et al. | ................ | 382/232 |
| 2002/0067501 A1 * | 6/2002 | Watanabe | ..................... | 358/1.15 |
| 2003/0095713 A1 * | 5/2003 | Toguchi et al. | ............... | 382/239 |
| 2004/0190044 A1 * | 9/2004 | Hashimoto et al. | .......... | 358/1.15 |

FOREIGN PATENT DOCUMENTS

| | | |
|---|---|---|
| JP | 11-41429 A | 2/1999 |
| JP | 11-098367 A | 9/1999 |
| JP | 2004-289556 A | 10/2004 |

* cited by examiner

*Primary Examiner* — Chan S Park
*Assistant Examiner* — Sean Motsinger
(74) *Attorney, Agent, or Firm* — Birch, Stewart, Kolasch & Birch, LLP

(57) ABSTRACT

An image data processing apparatus including: a compression processing section that divides image data into a plurality of partial data in a prescribed size, generates link information showing a mutual arrangement of each of the divided partial data, and generates compressed partial data by compressing each of the divided partial data; a plurality of expansion sections that expand the compressed partial data respectively; a data controller that assigns each of the compressed partial data to any one of the expansion sections, and operates the expansion sections to expand the compressed partial data substantially simultaneously; and an image data storage section that stores each of the expanded partial data, wherein the data controller determines an area of the image data storage section, in which each of the expanded partial data ought to be stored, and an output order of the stored partial data, based on the link information and the prescribed size of the partial data, so as to restore the original image data.

8 Claims, 4 Drawing Sheets

IMAGE DATA PROCESSING APPARATUS, IMAGE FORMING APPARATUS PROVIDED WITH THE SAME, IMAGE DATA PROCESSING PROGRAM, AND IMAGE DATA PROCESSING METHOD

CROSS-REFERENCE TO RELATED APPLICATION

This application is related to Japanese application No. 2006-294476 filed on Oct. 30, 2006 whose priority is claimed under 35 USC §119, the disclosure of which is incorporated by reference in its entirety.

BACKGROUND OF THE INVENTION

1. Field of the Invention

The present invention relates to an image data processing apparatus that compresses and stores image data, and expands and restores it in outputting, an image forming apparatus provided with the same, an image data processing program, and an image data processing method.

2. Description of the Related Art

There is known a device treating image data, such as compressing acquired image data and storing it as compressed data and expanding it at the time of use, to save a storage capacity. In many cases, the device that performs compression and expansion processing of the image data has a compression circuit (compression unit) and an extension circuit (expansion unit) to perform compression and expansion processing. Even in a case of the device that performs compressing and expansion processing by software, processing time appropriate for such a processing is required.

Meanwhile, in some of the aforementioned devices, the image data must be outputted at a prescribed speed when stored image data is used. For example, in an electrophotographic image forming apparatus, an electrostatic latent image is formed by sequentially exposing a surface of a photoconductor that moves at a constant speed, by dots of light corresponding to each pixel of the image data. The expansion processing of the compressed data must be completed by the time of performing exposure corresponding to each dot. For example, in a high speed image forming apparatus (high speed machine) in which the number of printed sheets per every minutes is 50 sheets or more, a moving speed of a photoconductor surface is faster than the moving speed of a middle/low speed machine. Also, in an expansion processing unit of the image data, a processing speed is required in matching with this unit. However, in the high speed machine, in some cases, the aforementioned moving speed exceeds a processing capability of an expansion unit single body. Therefore, there is known a device in which a plurality of expansion units are operated in parallel and an apparent expansion speed is increased. Further, there is known a device in which the number of the compression units and the expansion units is switched based on a data quantity of data to be processed (refer to, for example, Japanese Unexamined Patent Application Publication No. 11-41429).

The compressed data generated by compressing the image data as one block can be expanded only by one expansion unit. Accordingly, in order to operate a plurality of expansion units in parallel and realize high speed processing, a structure of compressed data needs to be devised at the time of compression. When the compression processing and expansion processing of the image data are always performed by specific compression unit and expansion unit, the structure of the compressed data may be simple.

However, for example, in some cases, there are a plurality of kinds of output destinations, and a speed to output the image data is different in each kind. As a specific example, there is given a case that the image data processing apparatus of the same type is mounted on a plurality of models of image forming apparatuses having different print speeds respectively. In addition, transfer of the compressed data is sometimes performed among a plurality of devices having different print speeds, respectively, such as a function of a dispersion treatment of one print job by a plurality of image forming apparatuses, namely, a case of executing a so-called tandem process. Alternately, there is a case that the image data obtained by a first device is held in this device and according to an instruction from a user, the data held by a second device connected via a network is transferred and is printed. Alternately, there is also such a case that the image data obtained by the first device is transferred to the second device via the network and is held by the second device, and according to the instruction from the user, the held data is printed by the second device. Such a processing form is a so-called one aspect of a filing function.

In such a case also, according to a performance of the device performing the expansion processing, it is remarkably preferable to have a data structure capable of changing an operation state such as with or without a parallel operation of the expansion unit or the number of the expansion units that perform the parallel operation. However, the structure of the data capable of realizing such a function is not simple.

SUMMARY OF THE INVENTION

In view of the above-described circumstances, the present invention is provided, and an object of the present invention is to provide a technique capable of parallely operating the expansion units of the number according to the performance of the device and capable of outputting the image data at a speed according to this performance, at the time of restoring original image data from compressed data and outputting this image data.

The present invention provides an image data processing apparatus including: a compression processing section that divides image data into a plurality of partial data in a prescribed size, generates link information showing a mutual arrangement of each of the divided partial data, and generates compressed partial data by compressing each of the divided partial data; a compressed data storage section that stores each of the compressed partial data generated by the compression processing section; a plurality of expansion sections that expand the compressed partial data respectively; a data controller that assigns each of the compressed partial data to any one of the expansion sections, and operates the expansion sections to expand the compressed partial data substantially simultaneously; an image data storage section that stores each of the expanded partial data; and an output section that outputs each of the stored partial data to the outside of the image data storage section, wherein the data controller determines an area of the image data storage section, in which each of the expanded partial data ought to be stored, and an output order of the stored partial data in the image data storage section, based on the link information and the prescribed size of the partial data, so as to restore the original image data.

Further, the present invention provides an image forming apparatus including: the aforementioned image data processing apparatus; and an image forming section that forms an image by using image data outputted from the image data processing apparatus.

Further, the present invention provides an image data processing program which operates computer functions of: a compression processing section that divides image data into a plurality of partial data in a prescribed size, generates link information showing a mutual arrangement of each of the divided partial data, and generates compressed partial data by compressing each of the divided partial data; a compressed data storage section that stores each of the compressed partial data generated by the compression processing section; a plurality of expansion sections that expand the compressed partial data respectively; a data controller that assigns each of the compressed partial data to any one of the expansion sections, and operates the expansion sections to expand the compressed partial data substantially simultaneously; an image data storage section that stores each of the expanded partial data; and an output section that outputs each of the stored partial data to the outside of the image data storage section, wherein the data controller determines an area of the image data storage section, in which each of the expanded partial data ought to be stored, and an output order of the stored partial data in the image data storage section, based on the link information and the prescribed size of the partial data, so as to restore the original image data from a different viewpoint.

Still further, the present invention provides an image data processing method in which a computer performs the steps of: dividing image data into partial data in a prescribed size, generating link information showing a mutual arrangement of each of the divided partial data, and generating compressed partial data by compressing each of the divided partial data, by a compression processing section; storing in a compressed data storage section each of the compressed partial data generated by the compression processing section; assigning each of the compressed partial data to any one of a plurality of expansion sections, and operating the expansion sections to substantially simultaneously expand the compressed partial data respectively, by a data controller; determining by the data controller an area of an image data storage section, in which each of the expanded partial data ought to be stored, based on the link information and the prescribed size of the partial data, and storing each of the expanded partial data in the determined area of the image data storage section, so as to restore the original image data; and determining by the data controller an order of the stored partial data in the image data storage section to be outputted, based on the link information of the partial data, and outputting by an output section each of the stored partial data to the outside of the image data storage section in the determined order from further different viewpoint.

DETAILED DESCRIPTION OF THE PREFERRED EMBODIMENTS

The image data processing apparatus of the present invention includes a compression processing section that generates partial compressed data that can be combined; and a data controller that assigns each partial compressed data to any one of a plurality of expansion units and operates them parallely. Therefore, expansion of the partial compressed data can be performed at a faster speed than a processing speed of an expansion unit single body. The number of the expansion units to be parallely operated is not limited by a data structure. Accordingly, it is possible to output image data by parallely operating the expansion units of the number according to a required output speed.

In addition, the image forming apparatus of the present invention includes the image data processing apparatus. Therefore, it is possible to perform image formation by parallely operating the expansion units of the number according to the processing speed of the expansion unit single body and a speed of image formation.

In the image data processing apparatus of the present invention, the prescribed size of the partial data may be determined by the prescribed number of main scanning lines, and the compression processing section may divide the image data according to the prescribed number of the main scanning lines. For example, when the image formation is performed by using the outputted image data, a usual case is that the image formation of each part is performed in an order of main scanning. When the image data is thus divided, each partial compressed data is expanded in an order of image formation and partial data is generated.

Further, the compression processing section may generate the compressed partial data with the link information by adding the link information generated by the compression processing section to the compressed partial data.

Still further, the image data processing apparatus according to the present invention may further include a size information storage section that stores a value of the prescribed size of the partial data corresponding to each of the compressed partial data.

In addition, the image data processing apparatus may further include: a speed acquiring section that acquires a speed in which the image data ought to be outputted from where the image data is outputted, wherein the data controller may further have a function of determining the number of the expansion sections that expand the compressed partial data substantially simultaneously, based on a previously defined expanding speed of a single expansion section and the speed acquired from where the image data is outputted. In this way, even when the image data processing apparatus of the same type is applied to an output destination of a plurality of kinds with different required output speeds respectively, it is possible to determine the number of the expansion sections to be parallely operated according to a speed obtained from the output destination.

Still further, the image data processing apparatus may further including: a compressed data receiving section that receives a single compressed image data from the outside of the image data processing apparatus, wherein the compressed data storage section may store the received image data received by the compressed data receiving section, and the data controller assigns the compressed image data to one of the expansion sections so as to restore the original image data. This is because the image data composed of only one partial compressed data can be expanded by only one expansion unit because of a data structure.

The present invention will be further described in detail hereunder by using the drawings. Note that explanation given hereunder is exemplification in all points, and should not be interpreted as restrictive.

Figure 2:
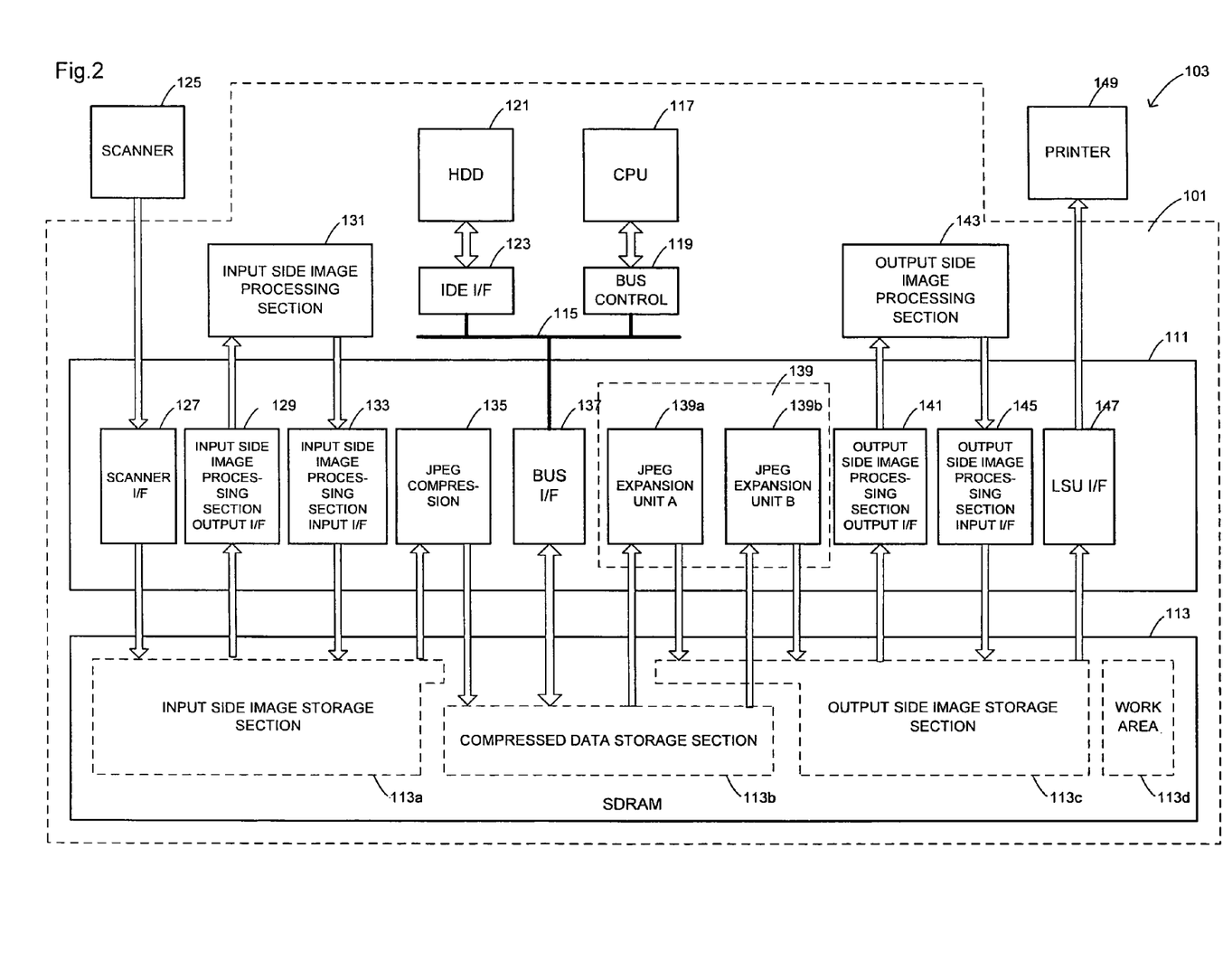
FIG. 2 is a block diagram showing a functional structure of an image forming apparatus provided with the image data processing apparatus of the present invention.

FIG. 2 is a block diagram showing a functional structure of an image forming apparatus provided with an image data processing apparatus of the present invention. In FIG. 2, an image forming apparatus 103 is composed of an image data processing apparatus (also called an image control unit or ICU) 101, a scanner section 125, and a printer section 149. The scanner section 125 is a device that reads an image of an original and provides image data to the image data processing apparatus 101. The printer section 149 is a device that prints the image data outputted from the image data processing apparatus 101 on a print sheet. In this embodiment, an electrophotographic printer is assumed to be the printer section 149. The printer section 149 has a laser scanning unit (LSU) that exposes a photoconductor according to the image data. The image data outputted from the image data processing apparatus 101 is sent to the LSU of the printer section 149.

The image data processing apparatus 101 is mainly composed of an image control circuit 111, SDRAM 113, CPU 117, a hard disk device (HDD) 121, an input side image processing section 131, and an output side image processing section 143.

According to this embodiment, each of the image control circuit 111, the input side image processing section 131, the output side image processing section 143 forms a circuit, each of them being contained in one LSI (Large Scale Integrated Circuit). The CPU 117 is connected to the image control circuit 111 via a bus control section 119 and a bus 115, and controls an operation of the image control circuit 111. In addition, the CPU 117 controls operations of the input side image processing section 131 and the output side image processing section 143. A block that processes the image data is integrated in the image control circuit 111.

The SDRAM 113 provides an area in which the image data and a control program executed by the CPU 117 are stored. According to its use, the area is classified into an input side image storage section 113a in which the image data inputted from outside is stored, a compressed data storage section 113b in which compressed image data is stored, an output side image storage section 113c in which the image data outputted to a printer section 149 is stored, and a work area 113d in which the control program to be executed by the CPU 117 and variables for processing, and the like, are stored. The input side image storage section 113a, the compressed data storage section 113b, the output side image storage section 113c store the image data transferred from the image control circuit 111 and a hard disk device 121, and the like, via the bus 115, and transfers the image data thus stored to the image control circuit 111 and the hard disk device 121. The input side image storage section 113a and the output side image storage section 113c correspond to an image data storage section of the present invention. In addition, the compressed data storage section 113b corresponds to a compressed data storage section of the present invention.

The CPU 117 executes the processing in accordance with the control program stored in the work area, and controls each processing of the image data processing apparatus. Such a processing includes the processing of giving an instruction to each block in the image control circuit 111 and controlling a transfer procedure of the image data.

A function of each block of the image control circuit 111 will be explained along a flow of the image data. The image data of an original read by a scanner section 125 is transferred to the input side image storage section 113a via a control of a scanner/interface section 127. Data per each pixel (bit map data) is stored in the input side image storage section 113a. More specifically, the scanner section 125 reads the original per each unit of the page and outputs the image data as a matrix of a pixel composed of a main scanning line and a sub scanning line.

When the image data of previously defined number of main scanning lines is stored in the input side image storage section 113a, the input side image processing section—the output interface section 129 transfer this image data to the input side image processing section 131 as one block (unit). The unit of this image data is partial data of the present invention. The input side image processing section 131 applies processing such as color conversion processing, image filter processing, and area separation processing to the transferred partial data. The input side image processing section—the input interface 133 store the partial data processed by the input side image processing section 131 in a new area of the input side image storage section 113a.

A JPEG compression section 135 compresses each partial data processed by the input side image processing section 131 and stored in the input side image storage section 113a, which is then stored in the compressed data storage section 113b. Each compressed data corresponds to partial compressed data of the present invention. Here, the JPEG compression section 135 gives information of link relation to each partial compressed data so that when each partial compressed data is expanded, each of them is combined to restore an original image. According to an aspect of the link information, each partial compressed data is stored in a storage area with continuous addresses in an order of the main scanning line, and self-data size is recorded in the header of each partial compressed data as header information. Thus, stored address of the header of the next partial compressed data can be calculated and referenced from each header information, thus making it possible to expand each partial compressed data by sequentially tracing the header. When each partial header thus expanded is stored in the storage area that continues in an arrangement order of the header, original image data can be restored. The aspect of the storage link information will be described in detail later.

A function of each of the input side image processing section—the output interface section 129, the input side image processing section—the input interface 133, and the JPEG compression section 135 correspond to the function of a compression processing section of the present invention.

As described above, each partial compressed data stored in the compressed data storage section 113b is transferred and stored in the hard disk device 121 according to a processing mode. However, when the image is outputted immediately, the processing is sometimes moved to output processing, with each partial compressed data held in the compressed data storage section 113b.

In a case of the print job by the filing function, when the user gives a print instruction to the image forming apparatus 103 by using an operation panel not shown, the CPU 117 acquires an output instruction of the image data and information specifying the image data, being an output object. Then, the CPU 117 gives the output instruction to the image control circuit 111. In a case of a usual copy job, when the original is read and is set in a state possible to be outputted, the CPU 117 gives the output instruction to the image control circuit 111. When the compressed data of the output object is stored in the hard disk device 121, the image control circuit 111 reads each partial compressed data, being the output object, from the hard disk device 121 via a IDE interface section 123 and a bus interface section 137, which is then stored in the compressed data storage section 113b.

A JPEG expansion section 139 expands each partial compressed data. Then, the expanded partial data is stored in the output side image storage section 113c. Here, the CPU 117 determines the number of JPEG expansion units used in expansion, according to the processing speed of the printer section 149, namely, the moving speed of the photoconductor, and processing speeds of a JPEG expansion unit A139a single body and a JPEG expansion unit B139b single body. The JPEG expansion unit A139a and the JPEG expansion unit B139b mutually have the same circuit structures and the same processing speeds. The JPEG expansion unit A139 and the JPEG expansion unit B139b correspond to an expansion section of the present invention.

The CPU 117 determines the storage area in which each expanded partial data is stored. An area thus determined is the area within the output side image storage section 113c. Based on the link information, the CPU 117 determines an order of expanding each partial compressed data and an output order of the expanded partial data. Then, the CPU 117 controls processing procedures of the JPEG expansion section 139, the output side image processing section—the output interface section 141, the output side image processing section—the input interface section 145, and an LSU interface section 147, so that the processing of each partial compressed data and each partial data is performed in the determined order. By the processing by the CPU 117, the function of the data controller of the present invention is realized. Preferably, each partial data is sequentially stored in the continuous storage area, and by a series of partial data stored in the continuous storage area, the original image data is restored. However, the present invention is not limited thereto.

When each partial data is stored in the output side image storage section 113c, the output side image processing section—the output interface section 141 transfer each partial data to the output side image processing section 143. The output side image processing section 143 applies processing to each transferred partial data. The processing here includes mainly the processing of converting each partial data expressed by each element of RGB into each element of YMCK, and the processing of correcting a value of halftone of each partial data expressed by YMCK according to the characteristic of the printer section 149. The output side image processing section—the input interface 145 store each partial data processed by the output side image processing section 143, in a new area of the output side image storage section 113c.

Finally, the LSU interface section 147 sequentially transfers each partial data processed by the output side image processing section 143 to the LSU of the printer section 149. The LSU interface section 147 corresponds to the output section of the present invention. Here, the CPU 117 may determine the storage area in which each partial data is stored, so that the image data per one page is stored in the continuous storage area, and may operate the output side image processing section—the input interface 145. Further, the LSU interface section 147 may transfer each partial data to the printer section 149 after each partial data constituting the image data of one page is prepared. Thus, the image data of one page stored in the continuous area can be transferred to the printer section 149 at once. Accordingly, a situation such as interruption of image data transfer in the middle of the page because the expansion processing can not follow an output speed, does not occur.

Figure 1A:
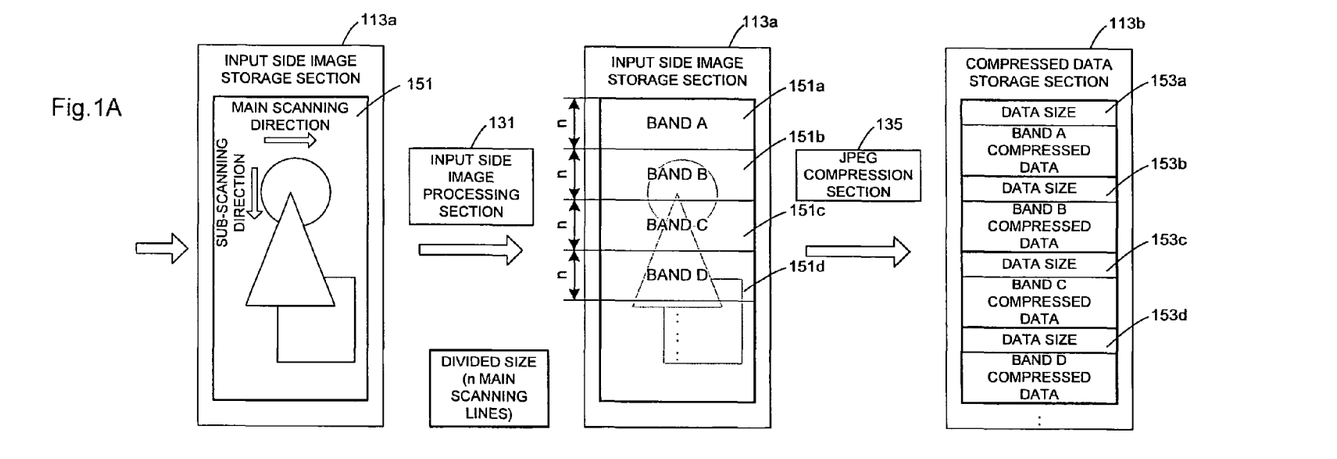
FIGS. 1A and 1B are explanatory views schematically showing a process in an order of processing from inputting image data of one page in an image data processing apparatus until this image data is outputted, in the present invention.
Figure 1B:
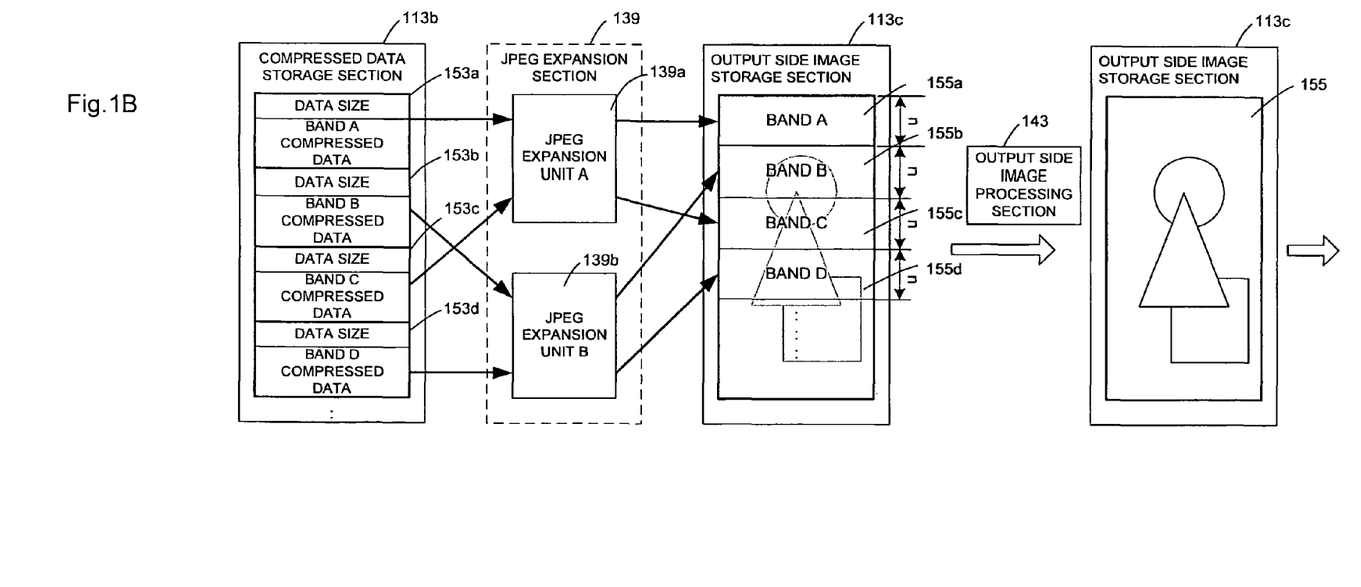

FIGS. 1A and 1B are explanatory views schematically showing a process from inputting the image data of one page to the image data processing apparatus 101 until this image data is outputted. FIG. 1A shows the process until the inputted image data is stored in the compressed data storage section 113b. FIG. 1B shows the process until the original image data is restored from the compressed data stored in the compressed data storage section 113b.

FIGS. 1A and 1B will be explained according to an order of the processing. When image data 151 of one page is inputted in the image data processing apparatus 101, the input side image processing section—the output interface section 129 divide the image data 151 into partial data 151a, 151b, 151c, and 151d according to a previously defined division size, and transfer it to the input side image processing section 131. Here, the division size may be a constant stored in a ROM or a nonvolatile memory not shown in the image forming apparatus 103.

This aspect is preferable in a case of performing control by using the division size according to the kind of the printer section 149, when the image data processing apparatus 101 of the same size is mounted on the printer section 149 of a plurality of kinds having different print speeds respectively. The CPU 117 acquires the division size stored in the ROM or the nonvolatile memory of the printer section 149 via a communication line not shown. In this aspect, the ROM or the nonvolatile memory in which the division size is stored corresponds to a size information storage section of the present invention.

Further, the CPU 117 may acquire from the printer section 149 the information regarding the output speed such as how many main scanning lines should be outputted per unit time by the image data processing apparatus 101. This function corresponds to a speed acquiring section of the present invention. Then, based on the acquired information of the output speed and a previously defined processing speed of the JPEG expansion sections 139a, 139b, the CPU 117 may judge whether the expansion processing should be parallely performed by using two JPEG expansion sections 139a and 139b, or the expansion processing should be performed by using only one JPEG expansion section.

In this embodiment, the division size is expressed by "n" main scanning lines. The input side image processing section—the output interface section 129 treat the inputted image data 151, with the partial data 151a, 151b, 151c, 151d, . . . composed of a width of "n" main scanning lines as a unit (band). For example, when "n" image data from the head is stored in the input side image storage section 113a, the input side image processing section—the output interface section 129 transfer it to the input side image processing section 131 as one unit. The input side image processing section 131 processes the transferred data. The input side image processing section—the input side interface section 133 store the data processed in the input side image processing section 131 in the input side image storage section 113a, as the partial data 151a of band A. Subsequently, the JPEG compression section 135 compresses the partial data 151a to generate the partial compressed data 153a of band A, and stores it in the compressed data storage section 113b. In the same procedure, the partial compressed data 153b of band B is generated from the (n+1) to (2n) numbered image data from the head, which is then stored in the compressed data storage section 113b. Further, the partial compressed data of band C, band D, . . . , are generated, with "n" main scanning lines as a unit, which are then stored in the compressed data storage section 113b.

Here, the input side image processing section—the input interface section 133 control so as to store each partial compressed data side by side in the storage area with continuous compressed data storage sections 113b, in an order of the main scanning lines. In addition, a size length (the number of bytes) of this partial compressed data is given to the head of each partial compressed data as the header. This size length is composed of a prescribed word length, and a value of the size length includes a length of the header. Accordingly, in each partial compressed data 153*a*, 153*b*, 153*c*, 153*d*, . . . corresponding to the image data 151, when the address of the partial compressed data 153*a* of the head is known, the header of the next partial compressed data 153*b* can be referenced by referencing the address added with the size length stored in the header. Further, the header of the next partial compressed data 153*c* can be referenced by referencing the address added with the size length stored in the header of the partial compressed data 153*b*. Thus, each partial compressed data generated from the image data 151 can be sequentially traced from the head. Note that after final partial compressed data, a value that can be identified as a normal size length such as zero may be set and stored. Thus, the terminal end of the page can be identified. In this embodiment, link information of the present invention is provided by the header of each partial compressed data and an arrangement order of the header.

Thereafter, when the CPU 117 receives an output instruction, the data of the output object is specified based on the information included in the instruction, and the specified data is read from the compressed data storage section 113*b*. In this embodiment, each of the partial compressed data 153*a*, 153*b*, 153*c*, 153*d*, . . . stored in FIG. 1A is object data. CPU 117 determines the number of JPEG expansion units used in expanding each partial compressed data. This number is determined based on the information regarding the output speed acquired from the printer section 149 and the previously defined processing speed of each JPEG expansion units 139*a* and 139*b*. For example, the printer section 149 provides the information showing that 6000 main scanning lines per second, with a long side direction of A4 size set as a maximum print width, should be outputted as the information regarding the output speed. The CPU 117 acquires this information from the printer section 149. In addition, 5000 main scanning lines per second are assumed to be previously defined as the processing speed of the JPEG expansion units 139*a* and 139*b*. This processing speed is a value defined at the time of designing the circuit of the JPEG expansion unit, and is stored in the hard disk device 121 as a constant, together with the control program. The CPU 117 compares the information acquired from the printer section 149 and the processing speed of the JPEG expansion unit, judges that each partial compressed data should be expanded by using both of the JPEG expansion units 139*a* and 139*b*, and sets the function of the JPEG expansion section 139. The JPEG expansion section 139 has the function of parallely operating two JPEG expansion units 139*a* and 139*b*. Namely, the partial compressed data 153*a* of band A is expanded by the JPEG expansion unit A139*a* and the partial expansion data 153*b* of band B is expanded by the JPEG expansion unit B139*b* in parallel. The JPEG expansion unit that ends the expansion processing expands the next partial compressed data 153*c*. In order to realize this processing, the JPEG expansion section 139 has a pointer indicating a head address of the partial compressed data to be expanded next.

Meanwhile, the partial data thus expanded and generated is stored in the continuous storage area of the output side image storage section 113*c*. Here, the JPEG expansion section 139 has a function of calculating the address in which each partial data is stored. The address in which each partial data is stored is composed of "n" main scanning lines, and therefore the storage address can be calculated, when the width of the image data in a main scanning direction is known and to what numbered band each partial data belongs is known. For example, the partial data 155*a* generated from the partial compressed data 153*a* of band A is generated from the partial compressed data of a first header, and therefore is stored from the head of the storage area secured in the output side image storage section 113*c*. The storage area of the partial data 155*b* generated from the partial compressed data 153*b* of a second header is calculated as the address added with offset by the number of "n" main scanning lines from the head address. Further, the storage area of the partial data 155*c* generated from the partial compressed data 153*c* of a third header is calculated as the address added with the offset by the number of (2×n) main scanning lines from the head address. Regarding the partial compressed data of a fourth header and thereafter, the offset from the head address is calculated in the same procedure. Accordingly, when it is known what numbered header an object of the expansion processing is, it is possible to obtain by calculation an offset value from the head address of the storage area in which the partial data generated from this partial compressed data is stored. It is easy for the persons skilled in the art that such an address calculation is realized in a form of a circuit.

Note that it is possible for the image data processing apparatus 101 to receive the compressed data generated by an external device via the network, which is then expanded and outputted. As an example thereof, there is a case that the compressed data generated by the external device is stored in the compressed data storage section 113*b* by the aforementioned filing function. Also, there is a case that the compressed data generated by the external image forming apparatus is printed by a tandem processing function. When the external device does not have the function of dividing and compressing the image data, the image data of one page is stored as one compressed data. Such a compressed data can be expanded only by one JPEG expansion unit. In this case, the CPU 117 assigns one JPEG expansion unit to the image data of one page.

The output side image processing section—the output interface section 141 transfer each expanded partial data to the output side image processing section 143. The output side image processing section 143 processes each partial data. The output side image processing section—the input interface section 145 store each partial data processed by the output side image processing section 143 in a new continuous area secured in the output side image storage section 113*c*. When the data of one page is prepared, the printer section 149 is notified of possibility of the output of the image data by the LSU interface section 147. The printer section 149 is then requests the output of the image data. Responding to the request from the printer section 149, the LSU interface section 147 transfers the image data stored in the output side image storage section 113*c*, to the printer section 149.

Figure 4:
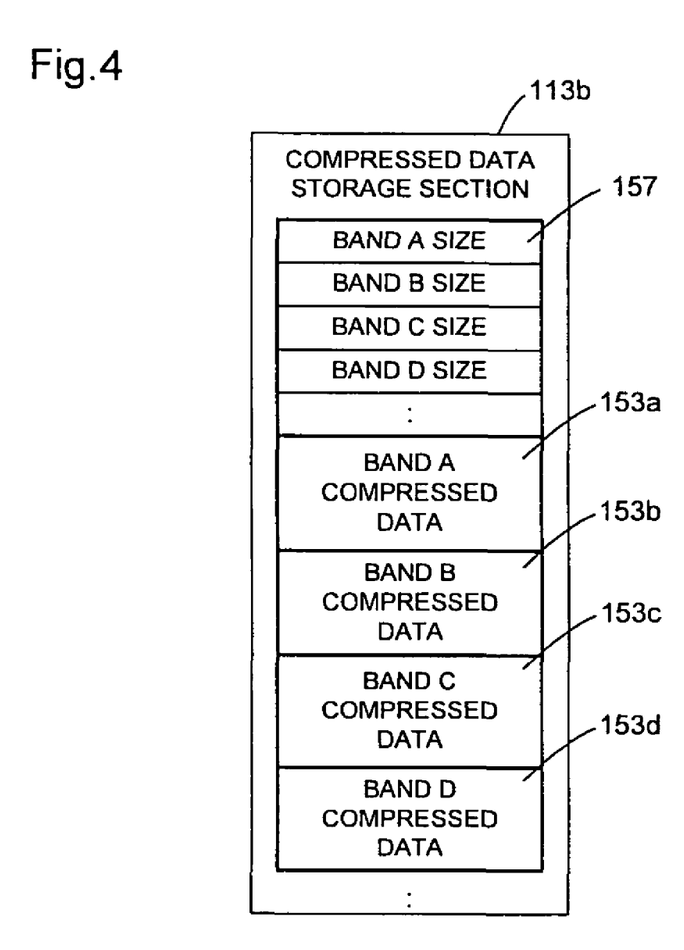
FIG. 4 is an explanatory view showing an example of a format different from the format of partial compressed data shown in FIG. 1.

In FIGS. 1A and 1B, each partial compressed data stored in the compressed data storage section 113*b* is added with the header showing the size length (number of bytes) of this partial compressed data, to its head. FIG. 4 is an explanatory view showing an example of a format different from the aforementioned partial compressed data. A data size of each partial compressed data is stored in the continuous storage area (data size storage area 157), separately from each partial compressed data. Thus, when the data size of each partial compressed data is collectively read, reading processing can be simple. Even in a case of the format other than this format, it is satisfactory when the information capable of restoring the original image by combining each partial compressed data is added and is stored in the compressed data storage section.

Figure 3:
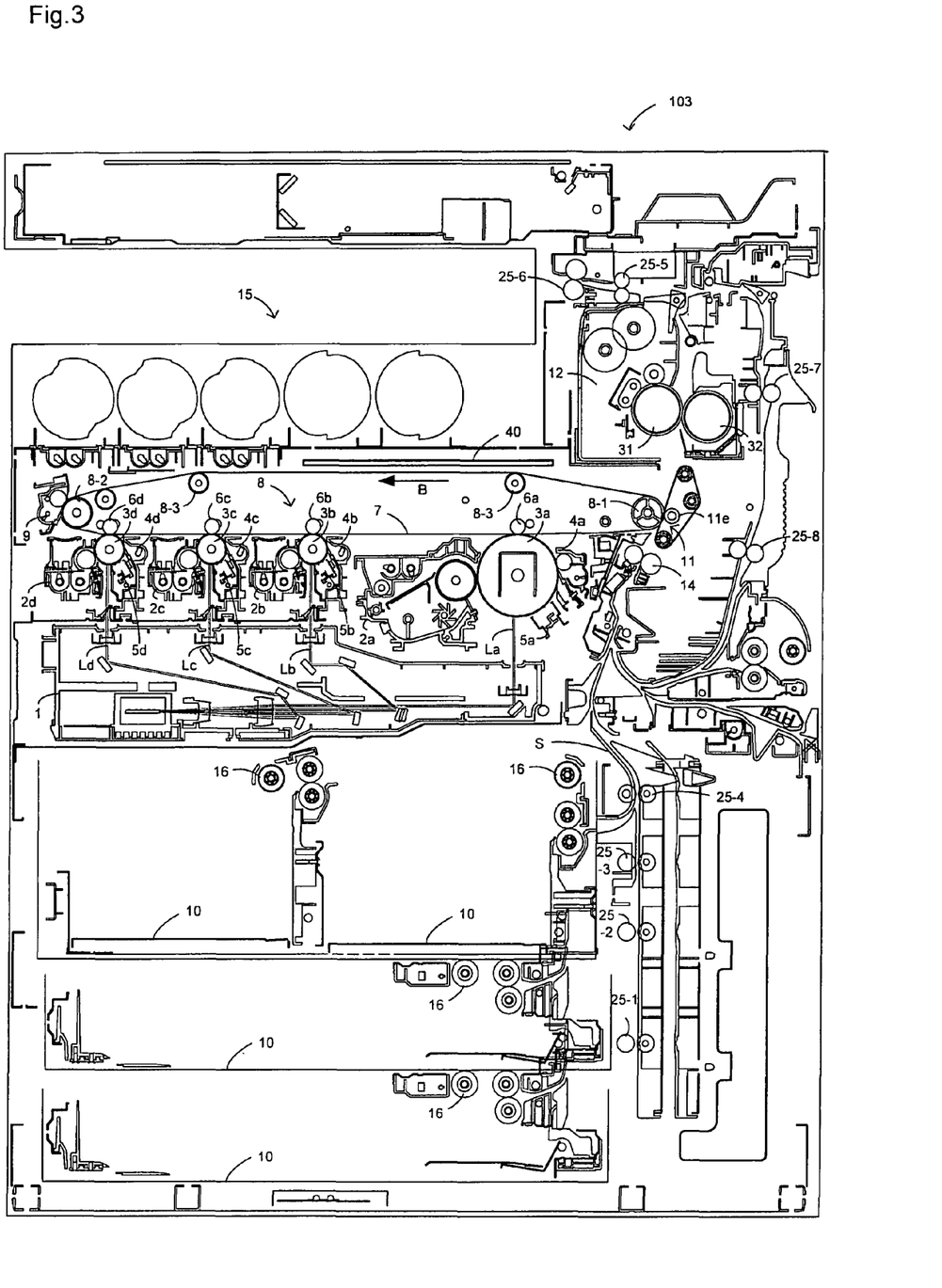
FIG. 3 is a sectional view showing a structure of the image forming apparatus according to the present invention.

Subsequently, an aspect of a mechanical structure of the image forming apparatus according to the present invention will be explained. FIG. 3 is a sectional view showing the structure of the image forming apparatus according to the present invention. The image forming apparatus 103 functions to form an image of full color and mono color on a prescribed sheet, according to the image data transferred from outside. Then, as shown in the figure, this is an electrophotographic type image forming apparatus constituted of an LSU 1, a developing unit 2, a photoconductor drum 3, a charging unit 5, a cleaner unit 4, an intermediate transfer belt unit 8, a fuser unit 12, a sheet path S, a sheet feeding tray 10, and a sheet exit tray 15, and the like.

Note that the image data treated in this image forming apparatus is the data responding to a color image by using each color of black (K or BK), cyan (C), magenta (M), and yellow (Y). Accordingly, four developing units 2 (2a, 2b, 2c, 2d), photoconductor drums 3 (3a, 3b, 3c, 3d), charging units 5 (5a, 5b, 5c, 5d), cleaner units 4 (4a, 4b, 4c, 4d) are provided respectively according to each color. English character in the end of designation marks shows a color correspondence such as "a" corresponding to black, "b" corresponding to cyan, "c" corresponding to magenta, and "d" corresponding to yellow. Four kinds of latent images corresponding to each color are formed on a peripheral surface of each photoconductor drum 3. Namely, four image stations corresponding to each color are constituted.

The structure of one image station will be explained hereunder, representing the four image stations. Other image stations have the same structures. Accordingly, the English character in the end of the designation marks is omitted. The charging unit 5 is a charging means to uniformly charge a surface of the photoconductor drum 3 to a prescribed potential. As the charging means, the charging unit of a roller type, a brush type and also a charger type may be used as an aspect of a contact type charging unit shown in FIG. 2.

The LSU 1 selectively exposes the surface of a charged photoconductor. Therefore, the LSU 1 has a laser irradiation section and a polygon mirror. Then, by the LSU 1, a laser beam L from the laser irradiation section is reflected by a rotating polygon mirror and is deflected, thereby scanning the surface of the photoconductor. The laser beam L is generated by reading the original or is modulated according to the image data generated by an external computer.

By scanning and exposing the photoconductor drum 3 charged by the laser beam L modulated by the image data, an image (an electrostatic latent image) according to the image data is formed on the surface of the photoconductor drum 3. The charging unit 2 develops the electrostatic latent image formed on each photoconductor drum 3 (render this image visible) by a toner of any one of the colors of K, C, M, Y. The cleaner unit 4 removes/recovers the toner remained on the surface of the photoconductor drum 3 after the electrostatic latent image is developed and transferred as will be described later.

The intermediate transfer belt unit 8 is disposed in an upper side of the photoconductor drum 3. The intermediate transfer belt unit 8 includes an intermediate transfer belt 7, an intermediate transfer belt drive roller 8-1, an intermediate transfer belt tension mechanism 8-3, an intermediate transfer belt driven roller 8-2, an intermediate transfer roller 6 (6a, 6b, 6c, 6d), and an intermediate transfer belt cleaning unit 9.

The intermediate transfer belt 7 is hung on the intermediate transfer belt drive roller 8-1, the intermediate transfer belt tension mechanism 8-3, the intermediate transfer roller 6, and the intermediate transfer belt driven roller 8-2, and the like, and is driven to rotate in a direction shown by arrow B.

The intermediate transfer roller 6 is rotatably supported by an intermediate transfer roller fixing section of the intermediate transfer belt tension mechanism 8-3 of the intermediate transfer belt unit 8. A transfer bias voltage is applied to the intermediate transfer roller 6, for transferring a toner image formed on the photoconductor drum 3 onto the intermediate transfer belt 7.

The intermediate transfer belt 7 is provided so as to come into contact with the photoconductor drum 3 for each color respectively. The toner image of each color formed on the surface of the photoconductor drum 3 is sequentially transferred onto the intermediate transfer belt 7 by the transfer bias voltage applied to the intermediate transfer roller 6. Thus, the toner image (full color toner image) is transferred onto the intermediate transfer belt 7 in a multilayer state. The intermediate transfer belt 7 is obtained by forming a film with a thickness of about 100 μm to 150 μm, in an endless state.

As described above, the intermediate transfer roller 6 comes into contact with a backside of the intermediate transfer belt 7, and serves as a transfer means to transfer the toner image onto the intermediate transfer belt 7 from the photoconductor drum 3. The transfer bias voltage of about several hundred volts (voltage of polarity (+) opposite to a charging polarity (−) of the toner) is applied to the intermediate transfer roller 6 for transferring the toner image.

The intermediate transfer roller 6 is a roller, with a metal (such as stainless) axis having a diameter of 8 to 10 mm as a base coated with a conductive elastic material (such as EPDM or urethane foam) on its surface. By this conductive elastic material, an approximately uniform voltage can be applied to the intermediate transfer belt 7. In this example, although a manual transfer roller is used as the transfer means, other than this manual transfer roller, a brush shaped transfer electrode (transfer brush) can serve as the transfer means by being brought into contact with the backside of the intermediate transfer belt 7.

The toner image transferred onto the intermediate transfer belt 7 is moved to a secondary transfer section 11 in which a secondary transfer roller 11e is disposed, along with a rotation of the intermediate transfer belt 7.

The intermediate transfer belt 7 and the secondary transfer roller 11e are press-fitted to have a prescribed nip width. In addition, the bias voltage is applied to the secondary transfer roller 11e, for transferring the toner image to a sheet as will be described later (high voltage of the polarity (+) opposite to the charging polarity (−) of the toner). The secondary transfer roller 11e and the intermediate transfer belt drive roller 8-1 are elastic rollers, either one of which is composed of a hard material (such as metal) and the other one is coated with a soft material (elastic rubber roller or urethane foam resin roller, and the like) on the surface of a cored bar. Thus, the nip of a prescribed width can be obtained constantly.

When the intermediate transfer belt 7 is brought into contact with the surface of the photoconductor drum 3, the toner is stuck to the intermediate transfer belt 7, in addition to an area to transfer the image onto the sheet. In addition, there is the toner remained on the intermediate transfer belt 7 without being transferred to the sheet by the secondary transfer roller 11e. The toner thus remained possibly causes mixing of colors in the toner to occur in the next step. Therefore, the intermediate belt cleaning unit 9 is provided, to remove/recover the toner on the intermediate transfer belt 7. The intermediate transfer belt cleaning unit 9 is provided with a cleaning blade as a cleaning member, and an end portion of the cleaning blade comes into contact with the intermediate belt 7 to remove the toner. The intermediate transfer belt 7 is supported by the intermediate transfer belt driven roller 8-2 from the backside, at a part where the intermediate transfer belt cleaning unit 9 and the intermediate transfer belt 7 are brought into contact with each other.

The sheet feeding tray 10 is a tray for piling-up the sheet used in image formation. The sheet feeding tray 10 is provided in a lower side of the LSU 1 of the image forming apparatus 103. In addition, the sheet exit tray 15 is provided in an upper part of this image forming apparatus 103. An already printed sheet is discharged face down and is piled-up in the sheet exit tray 15.

In addition, an approximately vertical shaped sheet path S is provided in this image forming apparatus 103, for feeding the sheet of the sheet feeding tray 10 to the sheet exit tray 15 through the secondary transfer section 11 and the fuser unit 12. Further, a pickup roller 16, a regist roller 14, the secondary transfer section 11, the fuser unit 12, a transfer roller 25 (25-1 to 25-8), and the like, are arranged in the vicinity of the sheet path S from the sheet feeding tray 10 to the sheet exit tray 15.

The transfer rollers 25-1 to 25-4 are small-sized rollers for accelerating/assisting the transfer of the sheet, and a plurality of them are provided along the sheet path S. The pickup roller 16 is provided on an end portion of the sheet feeding tray 10, to supply the sheet to the sheet path S one by one from the sheet feeding tray 10.

In addition, the regist roller 14 functions to stop the sheet transferred on the sheet path S at a prescribed position once. Then, the regist roller 14 has a function of transferring the sheet to the secondary transfer section 11 at a timing of synchronizing the ends of the toner image on the intermediate transfer belt 7 and the ends of the sheet.

The fuser unit 12 includes a heat roller 31 and a pressure roller 32, and the like, and the heat roller 31 and the pressure roller 32 are made rotatable, with the sheet sandwiched between them.

In addition, based on a signal from a temperature detector not shown, a heater not shown disposed in the heat roller 31 is controlled so as to be a prescribed fixed temperature by a controller of a control substrate 40. The heat roller 31 thermally compresses the sheet passed and transferred between the heat roller 31 and the pressure roller 32. Thus, a full-color toner image transferred onto the sheet is melted/mixed/press-fitted and is thermally fixed to the sheet.

Note that the sheet of the full-color toner image after being fixed is transferred to an inversion paper delivery path of the sheet path S by the transfer rollers 25-5 and 25-6, and is discharged on the sheet exit tray 15 in a state of being inverted (the full-color toner image is faced down).

Next, the sheet transfer route will be explained in detail. A sheet feeding cassette 10 that previously stores the sheet is disposed in this image forming apparatus.

Each pickup roller 16 is disposed on an end portion of the sheet feeding tray 10, so that the sheet is guided to the transfer path one by one.

The sheet transferred from the sheet cassette 10 is transferred to the regist roller 14 by the transfer rollers 25-1 to 25-4 on the transfer path, and is stopped at this regist roller 14. The regist roller 14 sends out the sheet to the secondary transfer section 11, the sheet stopped at a timing of aligning the ends of the stopped sheet and the ends of the toner image on the intermediate transfer belt 7. At the secondary transfer section 11, the toner image on the intermediate transfer belt 7 is transferred to the sheet thus sent out. Thereafter, the sheet passes through the fuser section 12. At this time, an unfused toner on the sheet is melted by heat and is naturally cooled after passing through the fuser section 12 and is fixed onto the sheet. Thereafter, the sheet is discharged onto the sheet exit tray 15 from a sheet exit roller 25-6, through the transfer roller 25-5.

The control substrate 40 is disposed in the lower side of the sheet exit tray 15. The control substrate 40 has a microcomputer that controls an operation of each section of the image forming apparatus 103, an ROM that stores a control program executed by the microcomputer, a work area in which the processing by the microcomputer is performed, and a RAM that provides the storage area of the image data. The microcomputer functions as a controller by executing the control program. The aforementioned image formation, transfer of the toner image, transfer of the sheet, and temperature control of the fuser section are realized by the function of the controller.

In addition, the control substrate 40 has an input circuit and an output circuit. The signal from a sensor disposed at each section in the image forming apparatus 103 is inputted in the input circuit, so that the microcomputer can perform the processing by using the inputted signal. The output circuit is a circuit that outputs the signal for driving a load disposed at each section. Further, the control substrate 40 exchanges the data with the image data processing apparatus 101 of the present invention, via a communication line not shown. Note that in FIG. 3, although the image data processing apparatus 101 is not shown, the substrate of the image data processing apparatus may be placed in the image processing apparatus 103.

Various modified examples of the present invention are possible other than the above-described embodiments. Such modified examples should not be interpreted as not belonging to the scope of the present invention. The present invention should include all modifications within the aforementioned scope and in an equivalent meaning to the scope of the claims.

What is claimed is:

1. An image data processing apparatus comprising a computer processor programmed with appropriate software to provide:

a processing section that divides image data into a plurality of divided partial image data that are each of a prescribed size;

a link information generating section that generates link information showing a mutual arrangement of each of the divided partial image data of the prescribed size;

a compression section that compresses each of the divided image data to provide compressed partial image data;

a compressed data storage section that provides for storage of each of the compressed partial image data compressed by the compression section in association with a corresponding segment of the link information into a storage device;

a plurality of expansion sections that expand the compressed partial image data respectively;

a speed acquiring section that acquires an output speed in which the image data ought to be outputted, transmitted from where the image data is outputted;

a data controller that determines the number of the expansion sections that expand the compressed partial image data substantially simultaneously, based on a previously defined expanding speed of a single expansion section and the speed acquired from where the image data is outputted;

the data controller further assigning each of the compressed partial image data to the determined number of the expansion sections, and operating the expansion sections to expand the compressed partial image data substantially simultaneously;

an image data storage section that stores each of the expanded partial image data;

an output section that outputs each of the stored partial image data to the outside of the image data storage section, wherein the data controller determines an area of the image data storage section, in which each of the expanded partial image data ought to be stored, and an output order of the stored partial image data in the image data storage section, based on the link information and the prescribed size of the partial image data, so as to restore the original image data.

2. The image data processing apparatus according to claim 1, wherein
the prescribed size of the partial image data is determined by the prescribed number of main scanning lines, and
the processing section divides the partial image data according to the prescribed number of the main scanning lines to form the partial image data of prescribed size.

3. The image data processing apparatus according to claim 1, wherein the compression section compresses each of divided partial image data to provide the compressed partial image data and adds the associated segment of the link information to the compressed partial image data.

4. The image data processing apparatus according to claim 1, further comprising a size information storage section that stores a value of the prescribed size of the partial image data corresponding to each of the compressed partial image data.

5. The image data processing apparatus according to claim 1, further comprising:
a compressed data receiving section that receives a single compressed image data from outside of the image data processing apparatus,
wherein the compressed data storage section separately stores the received single compressed image data received by the compressed data receiving section, and the data controller assigns the received single compressed image data received by the compressed data receiving section to one of the expansion sections so as to restore the original image data.

6. An image forming apparatus comprising:
the image data processing apparatus according to claim 1; and
an image forming section that forms an image by using image data outputted from the image data processing apparatus.

7. A non-transitory computer readable medium including an image data processing program which, when read by a computer operates computer functions of
a processing section that divides image data into a plurality of divided partial image data that are each of a prescribed size
a generating section generating link information showing a mutual arrangement of each of the divided partial image data of the prescribed size;
a compression section that compresses each of the divided image data of the prescribed size to provide compressed partial image data;
a compressed data storage section that stores each of the compressed partial image data compressed by the compression section in association with a corresponding segment of the link information in a storage device;
a plurality of expansion sections that expand the compressed partial image data respectively;
a speed acquiring section that acquires an output speed in which the image data ought to be outputted, transmitted from where the image data is outputted;
a data controller that determines the number of the expansion sections that expand the compressed partial image data substantially simultaneously, based on a previously defined expanding speed of a single expansion section and the speed acquired from where the image data is outputted;
the data controller further assigning each of the compressed partial image data to the determined number of the expansion sections, and operating the expansion sections to expand the compressed partial image data substantially simultaneously;
an image data storage section that stores each of the expanded partial image data; and
an output section that outputs each of the stored partial image data to the outside of the image data storage section,
wherein the data controller determines an area of the image data storage section, in which each of the expanded partial image data ought to be stored, and an output order of the stored partial image data in the image data storage section, based on the link information and the prescribed size of the partial image data, so as to restore the original image data.

8. An image data processing method in which a computer includes a computer processor programmed with appropriate software to perform the steps of:
dividing image data into divided partial image data of a prescribed size;
generating link information showing a mutual arrangement of each of the divided partial data of the prescribed size;
compressing each of the divided image data of the prescribed size to provide compressed partial image data using a compression section;
storing in a compressed data storage device each of the compressed partial image data compressed by the compression section in association with a corresponding segment of the link information;
acquiring an output speed in which the image data ought to be outputted, transmitted from where the image data is outputted;
determining the number of the expansion sections that expand the compressed partial image data substantially simultaneously, based on a previously defined expanding speed of a single expansion section and the speed acquired from where the image data is outputted;
assigning each of the compressed partial image data to the determined number of expansion sections, and operating the expansion sections to substantially simultaneously expand the compressed partial image data respectively, by using a data controller;
using the data controller to determine an area of an image data storage section, in which each of the expanded partial image data ought to be stored, based on the link information and the prescribed size of the partial image data, and storing each of the expanded partial image data in the determined area of the image data storage section, so as to restore the original image data; and
using the data controller to determine an order of the stored partial image data in the image data storage section to be outputted, based on the link information of the partial image data, and outputting by an output section each of the stored partial image data to the outside of the image data storage section in the determined order.

* * * * *